Feb. 4, 1936.　　　　P. F. THAU　　　　2,029,842
BICYCLE WITH HORSE RIDING ACTION
Filed Dec. 14, 1934　　　2 Sheets-Sheet 1

INVENTOR
PHILIP F. THAU
BY
ATTORNEY

Feb. 4, 1936. P. F. THAU 2,029,842
BICYCLE WITH HORSE RIDING ACTION
Filed Dec. 14, 1934 2 Sheets-Sheet 2
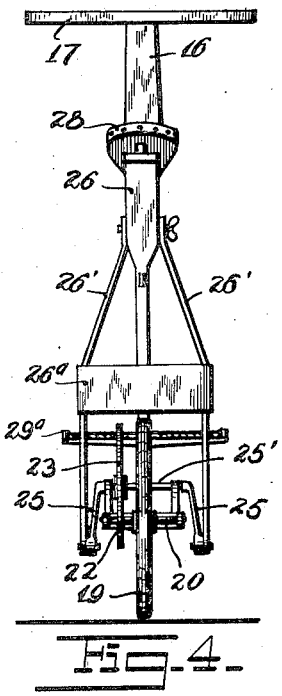
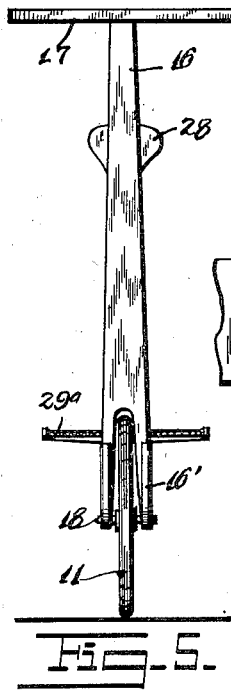
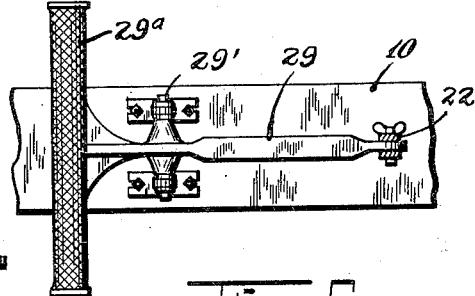
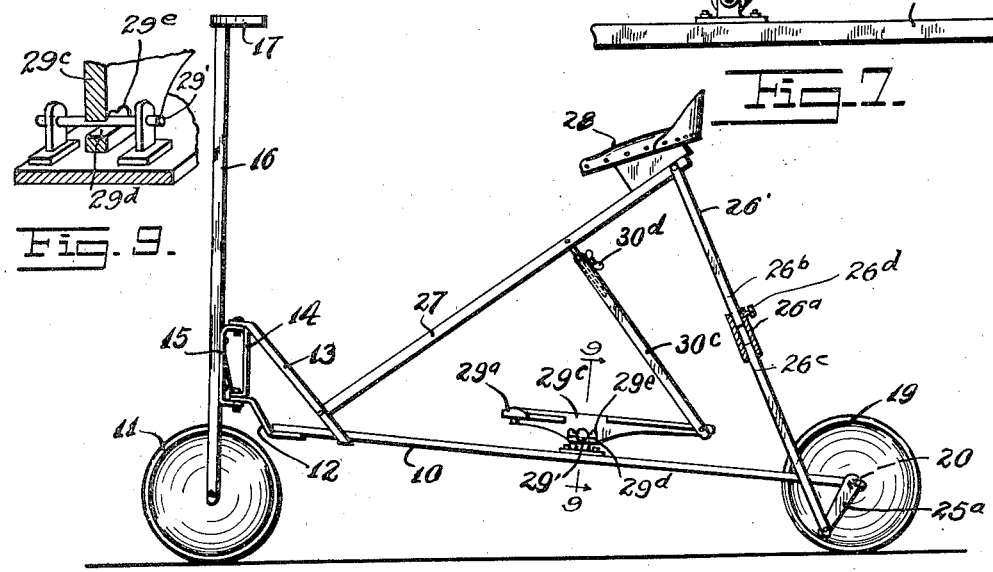
INVENTOR
PHILIP F. THAU
BY
ATTORNEY Patented Feb. 4, 1936

2,029,842

UNITED STATES PATENT OFFICE 2,029,842

BICYCLE WITH HORSE RIDING ACTION

Philip F. Thau, New York, N. Y.

Application December 14, 1934, Serial No. 757,435

6 Claims. (Cl. 208—34)

This invention relates to new and useful improvements in a bicycle and the like with a horse riding action.

The invention has for an object the construction of a device as mentioned which is characterized by a foot lever pivotally mounted intermediate of its ends upon a frame, and a pivotally mounted seat structure connected with the foot lever and with driving mechanism for the bicycle in such a manner that the foot lever may be pressed downwards to raise the seat, and one's weight may be placed upon the seat to lower the seat, and thus cause driving of the device.

A still further object of the invention is the provision of a rear rod connected with a crank mechanism for driving the rear wheel of the device, and extending forwards and upwards, and a front rod pivotally connected with the front of the frame of the device and extending rearwards and upwards and at the top end pivotally connected with the top of the rear rod, and an arrangement wherein the seat of the device is mounted on said rods.

Still further, the invention also contemplates the provision of a link connecting the rear end of the foot lever with the front rod and arranged substantially parallel with the rear rod.

Another one of the objects of this invention is an arrangement wherein the foot lever may be moved to various positions to control the mechanical advantage thereof.

Still further the invention proposes the construction of a device as mentioned which is simple and durable and which can be manufactured and sold at a reasonable cost.

For further comprehension of the invention, and of the objects and advantages thereof, reference will be had to the following description and accompanying drawings, and to the appended claims in which the various novel features are more particularly set forth.

In the accompanying drawings forming a material part of this disclosure:

Fig. 4 is a rear elevational view of Fig. 1 looking in the direction of the line 4—4.

Fig. 5 is a front elevational view of Fig. 1.

Fig. 6 is a fragmentary horizontal sectional view taken on the line 6—6 of Fig 1.

Fig. 7 is an elevational view of Fig. 6.

Fig. 8 is a side elevational view of another form of the device constructed according to the same invention.

Fig. 9 is a fragmentary enlarged sectional perspective view taken on the line 9—9 of Fig. 8.

Figure 1:
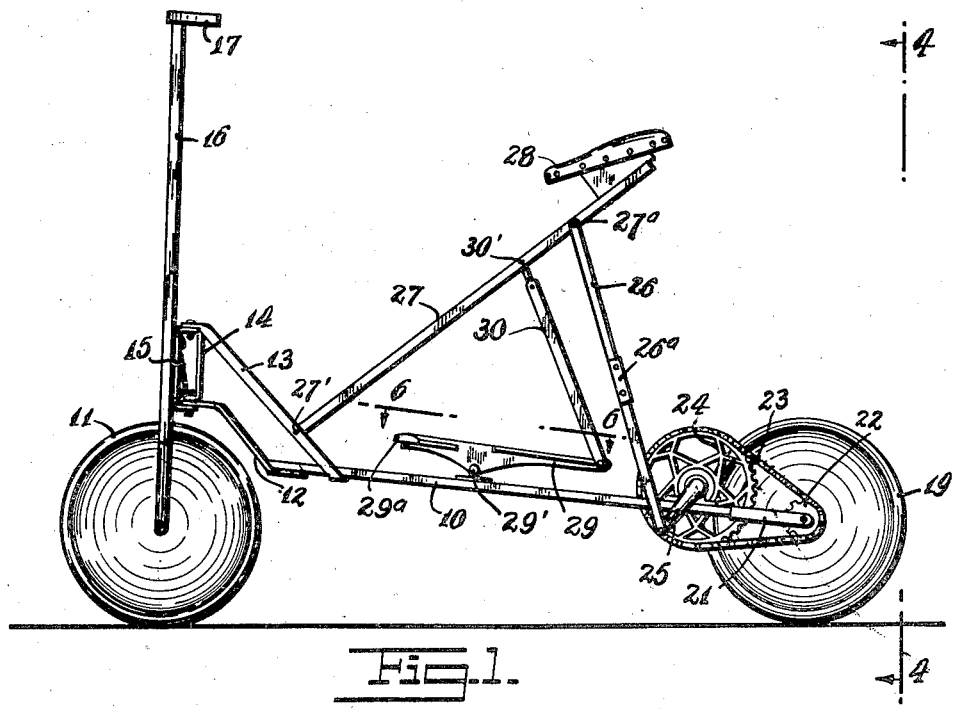
Fig. 1 is a side elevational view of a bicycle constructed according to this invention.
Figure 2:
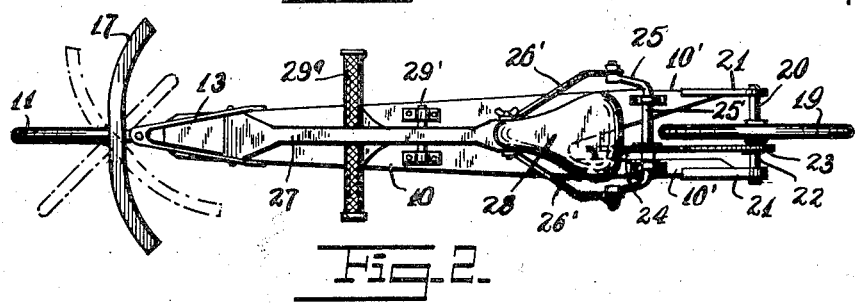
Fig. 2 is a plan view of Fig. 1.

The bicycle and the like with horse riding action, according to this invention, comprises a horizontal frame 10 associated with a front steering wheel 11 and steering mechanism. More particularly, braces 12 and 13 are mounted upon the front end of the frame 10 and support a vertical bracket 14. A complementary vertical bracket 15 is pivotally mounted on the bracket 14 and is connected with a steering column 16 of the steering mechanism. A handle 17 is mounted upon the top end of the column 16 which is formed with a forked portion 16' at the bottom in which the wheel is diposed. An axle 18 engages through the fingers of the fork and serves to rotatively support the wheel.

A rear wheel support is associated with the rear end of the horizontal frame 10 for supporting that portion thereof. More particularly, it comprises a wheel 19 fixed upon a shaft 20 rotative in bearings 21 mounted upon fingers 10' of a forked portion arranged upon the rear end of the frame 10.

A crank mechanism is associated with the rear wheel for driving the device. This crank mechanism comprises a sprocket pinion 22 mounted upon the axle 20 and associated with a sprocket chain 23 engaging over a sprocket wheel 24 which is mounted on the central portion 25' of a crank 25. The central portion 25' is rotatively mounted in bearing supported on the frame 10. The crank is arranged at both ends on the central portion. A rear rod 26 is adjustably connected with the crank 25 and extends forwards and upwards. This rear rod includes a pair of bottom side sections 26' forming a fork, the lower ends of which connect with the crank 25. The sections 26' are reinforced with a transverse brace 26ᵃ.

A front rod 27 is pivotally connected at its lower end 27' with the front of the frame 10 and extends rearwards and upwards, and near the top is pivotally connected at the point 27ᵃ with the top of the rear rod 26. A seat 28 is mounted on the rods, and more particularly, upon the upper end of the front rod 27.

A foot lever 29 is pivotally mounted intermediate its ends at the point 29' upon the frame 10. The front end of the foot lever has a transverse bar 29ᵃ for the feet of a user of the device. The rear end of the foot lever pivotally connects with a link 30 extending forwards and upwards and arranged substantially parallel to the rear rod 26 and pivotally connected a the top end intermediate the ends of the front rod 27 at the point 30'.

Figure 3:
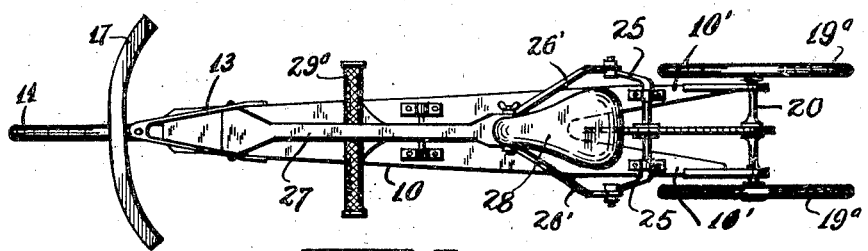
Fig. 3 is a view similar to Fig. 2 but illustrating the invention applied to a tricycle.

In Fig. 3 a modified form of the device is illustrated in which the rear wheel support comprises a pair of wheels 19ª arranged upon the ends of a shaft 20ª rotatively mounted in the bearings 21. This form of the invention shows an application to a tricycle. In other respects it is identical to the previous form, and similar parts may be recognized by identical reference numerals.

The operation of the device is as follows:

A person sits on the seat 28 and rests the feet on the cross bar 29ª. Pressure is then applied on the cross bar so as to pivot the lever 29 and move the seat 28 upwards. The rider assists the upward motion of the seat by reason of transferring some of his load upon the transverse bar 29ª. When the front of the lever 29 has been fully depressed, the person reverses his motion and sits heavily on the seat 28, simultaneously relaxing the downward pressure on the transverse bar 29ª. The upward and downward motion of the seat 28 is translated by the rear bar 26 and the crank 25 into a rotative motion which drives the rear wheel and consequently the bicycle, or tricycle.

In Fig. 8 another embodiment of the invention has been disclosed which is very similar to the previous form, differing only in several minor details. The parts which are identical in both structures may be recognized by the same reference numerals. A chief distinction is in the arrangement of the crank mechanism. More particularly, there is a crank 25ª directly on the shaft 20 of the rear wheel 19. A rear rod 26' is connected with the crank 25ª. With this arrangement, rotations are transmitted directly to the rear wheel, contrasted with the prior arrangement in which the rear wheel is driven at an increased speed ratio to the turning of the crank. Furthermore, the rear rod 26' comprises sections 26ᵇ and 26ᶜ adjustably held by the brace 26ª. The brace is fixed on the section 26ᶜ and is in the form of a section slidably supporting the section 26ᵇ. A set screw 26ᵈ mounted on the brace abuts the section 26ᵇ and holds it in adjusted position.

A further distinction is the provision of the foot lever 29ᶜ which is formed with a horizontal slot 29ᵈ having several branches 29ᵉ at the top. The transverse pivot 29' for the foot lever passes through the slot 29ᵈ, and the arrangement is such that the foot lever may be lifted and moved forwards or backwards to engage one or the other of the branches 29ᵉ upon the pintle pin 29'. Thus the mechanical advantage of the foot lever is altered. Furthermore the connecting link 30ᶜ is of two sections telescopically engaged with each other, and held in adjusted positions by a set screw 30ᵈ which is engaged through the outer section and abuts against the inner section. The change in the length of the link 30 is necessary to accommodate a change in the position of the foot lever 29ᶜ without causing an alteration of position of the seat of the device.

The operation of this form of the invention is identical to the prior form, except for the fact that the rotations are transmitted directly to the rear wheel, and there is a choice of the mechanical ratio between the foot pressure and the seat resistance.

While I have illustrated and described the preferred embodiment of my invention it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. In a bicycle and the like with a horse riding action, a horizontal frame, a front steering wheel and mechanism mounted on the front thereof, a rear wheel support for the rear of said frame, a crank mechanism for driving the rear wheel support, a rear rod connected with said crank and extending at an inclination upwards, a front rod pivotally connected with the front of said frame and extending rearwards and upwards, and at the top end pivotally connected with the top of said rear rod, a seat on said rods, a substantially horizontal foot lever pivotally mounted intermediate of its ends on said frame, and a link substantially parallel to said rear rod and connecting the rear end of the foot lever with said front rod.

2. A bicycle and the like with a horse riding action, comprising a horizontal frame, a front steering wheel and mechanism mounted on the front thereof, a rear wheel support for the rear of said frame, a crank mechanism for driving the rear wheel support, a rear rod connected with said crank and extending forwards and upwards, a front rod pivotally connected with the front of said frame and extending rearwards and upwards, and at the top end pivotally connected with the top of said rear rod, a seat on said rods, a foot lever pivotally mounted intermediate of its ends on said frame, and a link connecting the rear end of the foot lever with said front rod, said crank mechanism including a direct connection with the rear wheel.

3. A bicycle and the like, with a horse riding action, comprising a horizontal frame, a front steering wheel and mechanism mounted on the front thereof, a rear wheel support for the rear of said frame, a crank mechanism for driving the rear wheel support, a rear rod connected with said crank and extending forwards and upwards, a front rod pivotally connected with the front of said frame and extending rearwards and upwards, and at the top and pivotally connected with the top of said rear rod, a seat on said rods, a foot lever pivotally mounted intermediate of its ends on said frame, a link connecting the rear end of the foot lever with said front rod, and means for shifting the foot lever to various positions relative to the pivotal mounting to change the mechanical advantage thereof.

4. A bicycle and the like with a horse riding action, comprising a horizontal frame, a front steering wheel and mechanism mounted on the front thereof, a rear wheel support for the rear of said frame, a crank mechanism for driving the rear wheel support, a rear rod connected with said crank and extending forwards and upwards, a front rod pivotally connected with the front of said frame and extending rearwards and upwards, and at the top end pivotally connected with the top of said rear rod, a seat on said rods, a foot lever pivotally mounted intermediate of its ends on said frame, a link connecting the rear end of the foot lever with said front rod, means for shifting the foot lever to various positions relative to the pivotal mounting to change the mechanical advantage thereof, and means for adjusting the length of the rear rod.

5. A bicycle and the like with a horse riding action, comprising a horizontal frame, a front steering wheel and mechanism mounted on the front thereof, a rear wheel support for the rear of said frame, a crank mechanism for driving the rear wheel support, a rear rod connected with said crank and extending forwards and upwards, a front rod pivotally connected with the front of said frame and extending rearwards and upwards, and at the top end pivotally connected with the top of said rear rod, a seat on said rods, a foot lever pivotally mounted intermediate of its ends on said frame, a link connecting the rear end of the foot lever with said front rod, means for shifting the foot lever to various positions relative to the pivotal mounting to change the mechanical advantage thereof, and means for adjusting the length of the rear rod, said rear rod comprising sections adjustably connected with each other.

6. A bicycle and the like with a horse riding action, comprising a horizontal frame, a front steering wheel and mechanism mounted on the front thereof, a rear wheel support for the rear of said frame, a crank mechanism for driving the rear wheel support, a rear rod connected with said crank and extending forwards and upwards, a front rod pivotally connected with the front of said frame and extending rearwards and upwards, and at the top end pivotally connected with the top of said rear rod, a seat on said rods, a foot lever pivotally mounted intermediate of its ends on said frame, a link connecting the rear end of the foot lever with said front rod, means for shifting the foot lever to various positions relative to the pivotal mounting to change the mechanical advantage thereof, and means for adjusting the length of the rear rod, said rear rod comprising sections adjustably connected with each other, and means for holding the sections in various fixed positions.

PHILIP F. THAU.